United States Patent Office 3,775,298
Patented Nov. 27, 1973

3,775,298
HYDROCONVERSION PROCESS FOR PRODUCTION OF LPG IN PRESENCE OF MORDENITE ALUMINOSILICATE
Herbert C. Morris, Wappingers Falls, N.Y., and Thomas A. Cooper, Port Arthur, Billy H. Cummins, Nederland, and Donald E. Sweeney, Jr., Beaumont, Tex., assignors to Texaco Inc., New York, N.Y.
No Drawing. Continuation-in-part of abandoned application Ser. No. 778,789, Nov. 25, 1968. This application Oct. 27, 1971, Ser. No. 193,143
Int. Cl. C07c 3/00; C10g 13/02
U.S. Cl. 208—111   11 Claims

ABSTRACT OF THE DISCLOSURE

Gaseous hydrocarbons suitable for use in liquified petroleum gas, LPG, are produced by contacting a hydrocarbon feedstock under conversion conditions in the presence of a catalyst comprising a mordenite aluminosilicate, preferably containing a Group VIII metal having an atomic weight greater than about 100. In a preferred embodiment the mordenite has an increased silica to alumina mole ratio.

CROSS-REFERENCE TO RELATED APPLICATION

This is a continuation-in-part of application Ser. No. 778,789, Nov. 25, 1968, now abandoned.

BACKGROUND OF THE INVENTION

This invention relates to the conversion of normally liquid petroleum hydrocarbons into gaseous hydrocarbons. In one of its more specific aspects, the present invention relates to a process for the production of gaseous hydrocarbons by contacting normally liquid hydrocarbons with a crystalline aluminosilicate of the mordenite type. It is particularly concerned with the production of gaseous hydrocarbons by the conversion of normally liquid hydrocarbons in the presence of hydrogen and a decationized mordenite containing one or more of the Group VIII metals, particularly those having an atomic weight greater than about 100.

Catalytic hydroconversion of petroleum hydrocarbons is well known. Such processes as hydrocracking, hydrogenation, dehydrogenation, dealkylation and disproportionation are among the processes which have been utilized to catalytically convert hydrocarbons to other useful products. Catalysts which have found widespread use in these processes include silica, silica-alumina, and more recently the crystalline aluminosilicates. Among the aluminosilicates finding particular utility are zeolite X and Y, faujasite and other natural and synthetic zeolitic materials. Mordenite is an especially useful alumino-silicate found in the natural state and recently produced synthetically. In its hydrogen or decationized form it has been found to be a particularly effective hydroconversion catalyst. U.S. Pat. 3,259,564 discloses and claims a hydrocracking process for petroleum hydrocarbons utilizing a synthetic decationized mordenite composited with a noble metal hydrogenation component. This mordenite catalyst is said to show better hydrocracking ability as compared to known hydrocracking catalysts since it produces a lower gas make and a higher ratio of isobutane to normal butane thereby producing a gasoline product having a higher octane.

Normally gaseous hydrocarbons, i.e., $C_4$ and lighter, have a variety of uses and their demand varies with the specific marketing area. The $C_3$'s and $C_4$'s find particular use as a liquified petroleum gas, LPG, whereas the $C_2$ and $C_3$ fractions are excellent feedstocks for petrochemical manufacture. Therefore in those marketing areas where there is little demand for specific distillate streams, coupled with a demand for either LPG or petrochemical feedstocks, a process to convert the surplus distillates to $C_4$ and lighter hydrocarbons would have and would find particular utility.

SUMMARY OF THE INVENTION

The present invention provides a process wherein hydrocarbon feedstocks present in surplus quantities in a particular geographical area or hydrocarbon feedstocks having a minimal economic value may be converted to substantial quantities of $C_4$ and lighter hydrocarbons which will find particular utility as LPG and/or charge stocks for petrochemical manufacture. In particular, this process is a conversion process wherein normally liquid hydrocarbon feedstocks are contacted with a particular crystalline aluminosilicate under conversion conditions to produce substantial quantities of normally gaseous hydrocarbons. The crystalline aluminosilicate employed in this process is a decationized mordenite preferably having associated therewith a Group VIII metal having an atomic weight greater than about 100. In a preferred embodiment, the process is conducted in the presence of hydrogen.

More particularly, the process of our invention can convert such diverse feedstocks as straight run gasoline, kerosene, slack wax, waxy distillates, light gas oils, slop lubricating oil distillates, benzene and toluene to substantial quantities of normally gaseous hydrocarbons and under severe conditions will completely gasify a hydrocarbon feedstock. The process of our invention therefore has wide application and may be utilized effectively to maintain refinery balances by converting surplus or uneconomic feedstocks to more valuable products.

The gaseous hydrocarbons produced by our process have a variety of uses. The heavier gaseous materials may be utilized for alkylation charge stocks and in some instances for blending in gasoline production. The $C_3$ and $C_4$'s are quite valuable for use as liquified petroleum gas for industrial and home heating purposes. The lighter gaseous hydrocarbons, such as $C_2$ and $C_3$ fractions, find particular utility in petrochemical manufacture.

DESCRIPTION OF THE PREFERRED EMBODIMENTS

In accordance with the present invention, a hydrocarbon feedstock is contacted with hydrogen mordenite in a reaction zone under conversion conditions which produce substantial quantities of $C_4$ and lighter gaseous hydrocarbons. Although hydrogen need not be present to effect the desired conversion, its presence is to be preferred since it promotes prolonged catalyst life. Another optional feature which is preferred is the association of a catalytic metal with the mordenite aluminosilicate. Any of the Group VIII metals having an atomic weight greater than about 100 may usefully be incorporated with the mordenite, with platinium or palladium being particularly preferred.

It may also be desirable to employ a mordenite whose silica to alumina ratio has been substantially increased. Leaching with a mineral acid is one technique for achieving this result.

The catalyst used in our invention is a particular form of crystalline aluminosilicate known as mordenite. Although mordenite is naturally occurring in the sodium form, synthetic mordenites have become commercially available and are extremely useful in the process of our invention. In its sodium form mordenite usually has minimal catalytic activity and must therefore be converted to the hydrogen or decationized form before it finds utility in catalytic processes.

Mordenite structures are characterized by parallel sorption channels of uniform cross-section. The sorption channels are parallel to the C-axis of the crystal and are elliptical in cross-section. The sorption channels dimensions of sodium mordenite, based on crystallographic studies, have been reported as having a minor diameter of 5.8 to 5.9 A., a major diameter of 7.0–7.1 A. and a free diameter of 6.6 A.; the hydrogen form of mordenite is believed to have somewhat larger pore openings with a minor diameter of not less than about 5.8 A. and a major diameter less than 8 A.

Although mordenite occurs in nature, synthetic mordenites are commercially available from The Norton Company under the trade name Zeolon. These mordenites have a chemical composition, on a unit cell basis, of $$M_{8/n} \cdot Al_8 \cdot Si_{40} \cdot O_{96} \cdot 24H_2O$$

where M may be sodium, hydrogen or some other exchangeable cation and $n$ is the valance of the cation. The high mole ratio of silica to alumina of 10:1 in the synthetic mordenite permits complete acid exchange to a stable hydrogen form and imparts excellent chemical and thermal stability. The effective working diameter of hydrogen mordenite prepared by acid treating synthetic sodium mordenite and marketed under the trade name Zeolon H appears to be in the range of 8 to 10 A. as indicated by absorption of aromatic hydrocarbons.

The sodium form of mordenite is not effective in the process of our invention regardless of whether the temperature is within the range we usually employ and regardless of catalyst additions. However, the hydrogen form of synthetic mordenite having a sodium content of less than 5 weight percent is exceptionally effective for the conversion of normally liquid hydrocarbons to normally gaseous hydrocarbons. Decationized mordenite, i.e., mordenite in the hydrogen form, may be produced by ion exchange of the sodium in the mordenite with ammonium ions followed by heating or calcining to drive off ammonia. However, an extremely effective method of producing the decationized mordenite is by acid treatment. In addition to decationizing the mordenite, acid treatment may also be used to remove some of the aluminum from the zeolitic structure, thereby increasing the relative proportions of silica to alumina in the zeolite. In its sodium form, both natural and synthetic mordenite have a mole ratio of silica to alumina of about 10 to 1. Decationized mordenite also has a silica to alumina mole ratio slightly above 10 to 1. In its decationized form mordenite to produce the decationized form may remove aluminum sufficiently to increase the silica to alumina ratio slightly above 10 to 1. In its decationized form mordenite may be effectively employed in the process of our invention with or without the addition of catalytic metals. We have found, that further acid leaching of a mordenite zeolite in hydrogen form and impregnating it with a suitable Group VIII metal produces a catalyst which is particularly useful in the process of our invention.

The acid leaching used to produce the mordenite catalysts employed in our process must be severe enough to substantially increase the silica to alumina mole ratio of the mordenite to above about 10:1. However, the acid leaching must not be so severe as to destroy the crystalline structure of the mordenite. Further, little improvement has been observed in our process where the silica to alumina mole ratio of the mordenite is greater than about 100:1. Consequently, as a practical limit the acid leaching should be severe enough to produce a mordenite having a silica to alumina mole ratio between 10:1 and 100:1, preferably between about 20:1 and 60:1 and, more preferably, greater than about 10:1 and less than about 20:1.

Acid leaching may be suitably effected with mineral acids which will selectively remove aluminum without destroying the zeolitic crystalline structure, for example, hydrochloric or sulfuric acid. Boiling dilute hydrochloric acid is extremely effective in removing the aluminum. Following the leaching, the mordenite is water washed and calcined, with or without catalytic metal additions, in air at elevated temperatures up to about 1000° F. Because of this preparation method, these catalysts are referred to hereinafter for convenience as severely acid leached mordenites.

Although we have described an acid treating technique for preparing the mordenite catalysts used in our process, this has been used for purposes of illustration and not of limitation as there is no intention of excluding any equivalents. Thus, hydrogen mordenites having silica to alumina mole ratios between about 10:1 and about 100:1 prepared by other methods may also be employed in our process.

Structurally mordenite is significantly distinguishable from other zeolites. Mordenite has a chain type zeolite structure in which a number of chains are linked together into a structural pattern with parallel sorption channels similar to a bundle of parallel tubes. In contrast Type A, Type X and Type Y synthetic zeolites and faujasite have three dimensional crystalline cage structures having 4 to 6 windows or pore openings per unit cell through which access may be had to the inner cavity or unit cell of the zeolite molecular sieve. Although these three dimensional molecular sieves are important catalysts in a number of hydrocarbon reactions, they are not as effective for the production of gaseous hydrocarbons as the mordenite catalysts used in our process.

In a preferred method of operation, hydrocarbon feedstocks are passed in contact with a synthetic mordenite in hydrogen form and having associated therewith one of the Group VIII metals having an atomic weight greater than about 100. The catalyst metal may be incorporated in or on the mordenite either by ion exchange or impregnation techniques well known in the art of catalyst manufacture. These metals are effective if present in concentrations of 0.05 to 5 wt. percent. Platinum or palladium are to be particularly preferred additions to the decationized mordenite.

A wide variety of hydrocarbon feedstocks may be processed to produce substantial quantities of gaseous hydrocarbons by the process of our invention. These feedstocks may have compositions ranging from essentially all saturated paraffinic hydrocarbons to essentially all aromatic hydrocarbons. High boiling distillates obtained from crude oil constitute exceedingly advantageous feedstocks for our process. These distillates may range from naphtha and kerosene through light and heavy virgin gas oils, and may even include paraffin waxes. The individual composition of each fraction will vary considerably according to crude oil source and the boiling range of the particular fraction under consideration. The boiling range of the feedstock will dictate, in a general way, the severity of processing conditions required to produce substantial quantities of gaseous hydrocarbons by the process of our invention. For example, a straight run gasoline will require less severe conditions than a waxy distillate. Molecular structure will also indicate the severity of conditions required. Thus, a fairly light distillate, predominantly paraffinic in nature, will require less severe conditions than a feed stream containing substantial quantities of benzene or toluene.

Typical examples of charge stocks which may be utilized in the process of our invention are straight run gasoline, kerosene, slack wax, lubricating oil slop cuts, waxy distillates, gas oils, both virgin and cycle, and such pure aromatic hydrocarbons as benzene and toluene. This list is illustrative rather than an exhaustive enumeration of useful feedstocks. The utility of our process and the wide variety of feedstocks which may be employed will be evident to one skilled in the art from a review of the disclosure herein and the appended examples.

Broadly, the operating conditions we employ to effect the desired conversion include a temperature of 400–1100° F., a space velocity of 0.1–10 v./hr./v. and, optionally, a hydrogen rate of 100–20,000 s.c.f./b. of feed. In general, preferred operating conditions for the production of gaseous hydrocarbons by the process of our invention when utilizing a hydrogen mordenite containing a useful Group VIII metal include: temperature of 400–1000° F., preferably 550–850° F.; pressure of 0–3000 p.s.i.g., preferably 100–1500 p.s.i.g. and space velocity of 0.1–10 v./hr./v., preferably 0.2–5 v./hr./v. If hydrogen is used, and this is to be preferred, hydrogen rates should be 100–20,000 s.c.f./b. of feed, preferably 1000–10,000 s.c.f./b. of feed. When a Group VIII metal is not associated with the mordenite and hydrogen is not added to the reaction zone the preferred operating conditions include: temperature of 500–1100° F., preferably 600–900° F.; pressure of 0–3000 p.s.i.g., preferably 0–1500 p.s.i.g. and a space velocity of 0.1–5 v./hr./v., preferably 0.2–2 v./hr./v. In the latter situation where a Group VIII metal is not present but hydrogen is employed, the preferred range is 500–20,000 s.c.f./b. of the feed.

The process of our invention may be practiced batchwise or continuously. When a continuous mode of operation is employed, it is preferable to convert at least 30% of the feed per pass. Optionally, it is advantageous to recover the unconverted hydrocarbons from the effluent stream and recycle them to the reaction zone. It will be appreciated that by recycling a portion of the effluent when relatively mild conversion conditions are employed substantially the same result will be achieved as when relatively severe conditions are used in a once-through operation. In a similar fashion, any hydrogen present in the gaseous product stream can also be recovered and recycled to the reaction zone.

It will be readily apparent to those skilled in the art that the yield of gaseous products from the process of our invention will be dependent not only upon the particular feedstock being utilized but by the severity of the processing conditions employed. Therefore when processing a given feedstock suitable operating conditions will be selected to produce the gaseous yield required while insuring maximum on-stream time of the catalyst between periods of regeneration.

As the catalyst ages, its activity for the desired reaction tends to slowly diminish. Periodically the catalyst activity may be returned to approximately its initial level by increasing the operating temperature as the catalyst ages.

The following examples illustrate the advantages of our invention. A variety of feedstocks was used in these runs. In Examples 1 to 5 the catalyst was a synthetic hydrogen mordenite manufactured and sold by The Norton Company under the trade name Zeolon H. These catalysts contained varying amounts of Group VIII metals. In Example 6, the hydrogen mordenite was acid leached resulting in an increase of the silica to alumina mole ratio to 18:1. Examples 7 and 8 are runs made for comparison purposes with a hydrocracking catalyst and a catalytic cracking catalyst, respectively. Details of the feedstocks, catalysts, operating conditions and product analyses for Examples 1 to 8 are presented in Table I below.

TABLE I

| Example Number | 1 | 2 | 3 |
|---|---|---|---|
| Catalyst | H Mordenite | H Mordenite | H Mordenite. |
| Metal addition | 0.5% Pd | 0.5% Pd | 1% Pd. |
| Charge stock | Slack wax | Slack wax | Heavy naphtha. |
| Gravity, °API | 39.6 | 39.6 | 52.0. |
| Viscosity, SUS/210° F | 34.8 | 34.8 | |
| ASTM distillation, °F.: | | | |
| IBP | | | 247. |
| 50% | | | 299. |
| 90% | | | 352. |
| Oil in wax, percent | 3.5 | 3.5 | |
| Operating conditions: | | | |
| Temperature, °F | 575 | 600 | 706. |
| Pressure, p.s.i.g | 850 | 850 | 850. |
| SV, v./hr./v | 0.5 | 0.25 | 0.68. |
| H₂ rate, s.c.f./b. of feed | 7,000 | 10,000 | 4,000. |
| Results: | | | |
| Liquid yield, vol. percent | 52.1 | 0 | 51.3. |
| Gas analysis (H₂ free), vol. percent: | | | |
| Methane | 14.1 | 3.0 | 3.8. |
| Ethylene | 1.0 | | 1.5. |
| Ethane | 10.3 | 3.0 | 1.9. |
| Propylene | 1.7 | | |
| Propane | 46.7 | 55.2 | 25.8. |
| Isobutane | 10.7 | 14.9 | 21.0. |
| n-Butane | 11.7 | 23.9 | 16.5. |
| Butylene | | | 1.5. |
| Isopentane | 2.4 | | 9.4. |
| n-Pentane | 1.4 | | 12.8. |
| Pentylene | | | 2.7. |
| C₆+ | | | 3.1. |
| Gas in C₃–C₅ range: | | | |
| Total C₃ | 48.4 | 55.2 | 25.8. |
| Total C₄ | 22.4 | 38.8 | 39.0. |
| Total C₅ | 3.8 | | 24.9. |
| Total C₃–C₅ | 74.6 | 94.0 | 89.7. |

| Example Number | 4 | 5 | 6 |
|---|---|---|---|
| Catalyst | H Mordenite | H Mordenite | Acid leached H Mordenite. |
| Metal addition | 1% Pd | 2% Pd | 2% Pd. |
| Charge stock | Benzene | Toluene | Wax distillate. |
| Gravity, °API | | | 30.1. |
| Viscosity, SUS/210° F | | | 50.8. |
| ASTM distillation, °F.: | | | Vac. dist. |
| IBP | | | 650. |
| 50% | | | 815. |
| 90% | | | 888. |
| Boiling point, °C | 80.1 | 110.6 | |
| Operating conditions: | | | |
| Temperature, °F | 815 | 810 | 650. |
| Pressure, p.s.i.g | 850 | 850 | 850. |
| SV, v./hr./v | 0.50 | 0.50 | 0.51. |
| H₂ rate, s.c.f./b. of feed | 8,000 | 5,800 | 7,500. |

TABLE I—Continued

| Example Number | 4 | 5 | 6 |
|---|---|---|---|
| Results: | | | |
| Liquid yield, vol. percent | 9.3 | 0 | 56.5 |
| Gas analysis (H₂ free), vol. percent: | | | |
| Methane | 9.7 | 10.0 | |
| Ethylene | 4.6 | 0.7 | |
| Ethane | 31.9 | 12.8 | 5.7 |
| Propylene | | | 0.9 |
| Propane | 44.5 | 51.9 | 52.9 |
| Isobutane | 1.4 | 6.9 | 13.2 |
| n-Butane | 3.2 | 10.4 | 16.0 |
| Butylene | 0.5 | 1.1 | |
| Isopentane | | | |
| n-Pentane | 4.2¹ | 6.2¹ | 11.3¹ |
| Pentylene | | | |
| C₆+ | | | |
| Gas in C₃-C₅ range: | | | |
| Total C₃ | 44.5 | 51.9 | 53.8 |
| Total C₄ | 5.1 | 18.3 | 29.2 |
| Total C₅ | 4.2¹ | 6.2¹ | 11.3¹ |
| Total C₃-C₅ | 53.8 | 76.4 | 94.3 |

| Example Number | 7 | 8 |
|---|---|---|
| Catalyst | Zeolite Y base. Hydrocracking catalyst. | High alumina. Cat cracking catalyst. |
| Metal addition | NiWS | None. |
| Charge stock | Hydrotreated cycle gas oil. | Virgin gas oil. |
| Gravity, °API | 32.8 | 30.9 |
| Viscosity, SUS/210° F | | |
| ASTM distillation, °F.: | | |
| IBP | 290 | 456 |
| 50% | 600 | 624 |
| 90% | 698 | 744 |
| Pour, °F | +50 | +55 |
| Operating conditions: | | |
| Temperature, °F | 640 | 913 |
| Pressure, p.s.i.g. | 1,500 | 0.5″ H₂O |
| SV, v./hr./v. | 0.98 | 2.0 |
| H₂ rate, s.c.f./b. of feed | 7,250 | 5.8² |
| Results: | | |
| Liquid yield, vol. percent | 48.8 | 71.5 |
| Gas analysis (H₂ free), vol. percent: | | |
| Methane | 20.9 | 13.8 |
| Ethylene | 1.5 | 5.7 |
| Ethane | 8.5 | 2.3 |
| Propylene | 1.3 | 26.4 |
| Propane | 19.3 | 9.7 |
| Isobutane | 21.7 | 15.0 |
| n-Butane | 9.0 | 4.0 |
| Butylene | 0.6 | 18.8 |
| Isopentane | 11.8 | 4.0 |
| n-Pentane | 3.6 | 0.0 |
| Pentylene | 0.3 | 0.2 |
| C₆+ | 1.5 | 0.0 |
| Gas in C₃-C₅ range: | | |
| Total C₃ | 20.6 | 36.1 |
| Total C₄ | 31.3 | 37.8 |
| Total C₅ | 15.7 | 4.3 |
| Total C₃-C₅ | 67.6 | 78.2 |

¹ C₅ and heavier.  ² Cat/oil ratio.

The examples show that the process of our invention produces substantial quantities of gaseous hydrocarbons useful as LPG and petrochemical feedstocks from a variety of petroleum distillates and liquid hydrocarbons. In particular, high concentrations of normal butane, isobutane, and, especially, propane are found in the product gas when hydrogen mordenite is the catalyst as compared to other conventional hydroconversion catalysts.

EXAMPLE 9

This example demonstrates the process of our invention when no catalytic metals are associated with the hydrogen mordenite and no hydrogen is added to the reaction zone.

300 cc. of a light paraffinic gas oil (30.5° API, 36.1 SUS/210° F., ASTM Dist.: IBP—604° F., 50%—667° F., EP—750° F.) plus 50 cc. of decationized synthetic mordenite (Zeolon H) were placed in a rocking bomb. The bomb was held at 750° F. for three hours at 0 p.s.i.g. The results are shown in Table II.

The gaseous product contained predominately hydrogen, propane, methane and ethane but, surprisingly, relatively few olefinic compounds. A higher conversion to gaseous products can be obtained with more severe operating conditions.

The terms and expressions used herein are used as terms of description and not of limitation as there is no intention by the use of such terms and expreion of excluding any equivalent. It is recognized that various modifications and variations of the invention, as hereinbefore set forth, may be made without departing from the spirit and scope thereof and therefore only such limitations should be imposed as are indicated in the claims.

TABLE II

| Yield, vol. percent of charge: | |
|---|---|
| Total liquid | 71 |
| Coke | 3 |
| Gas | 26 |
| MS gas analysis, vol. percent: | |
| Hydrogen | 38.2 |
| Methane | 10.4 |
| Ethylene | 1.6 |
| Ethane | 8.8 |
| Propylene | 1.5 |
| Propane | 20.2 |
| Isobutane | 4.0 |
| n-Butane | 5.4 |
| Butylene | 2.3 |
| Isopentane | 1.5 |
| n-Pentane | 2.2 |
| Pentylene | 1.6 |
| C₆+ | 2.3 |

We claim:

1. A process for producing normally gaseous hydrocarbons which comprises:
   contacting a normally liquid hydrocarbon feed and hydrogen in a reaction zone with a decationized crystalline aluminosilicate of the mordenite type having a silica to alumina mole ratio of about 10:1 under hydroconversion conditions effecting conversion of said normally liquid hydrocarbon feed to normally gaseous hydrocarbons.

2. A process according to claim 1 wherein the hydroconversion conditions include a temperature of 400-1100° F., a pressure of 0-3000 p.s.i.g., a space velocity of 0.1-10 v./hr./v. and a hydrogen rate of 100-20,000 s.c.f./b. of feed.

3. A process according to claim 1 wherein a Group VIII metal having an atomic weight greater than 100 comprising between about 0.05-5.0 wt. percent of said aluminosilicate is intimately associated with said aluminosilicate.

4. A process according to claim 3 wherein the hydroconversion conditions include a temperature of 550-850° F., a pressure of 100-1500 p.s.i.g., a space velocity of 0.2-5 v./hr./v. and a hydrogen rate of 1000-10,000 s.c.f./b. of feed.

5. A process according to claim 1 wherein said normally liquid hydrocarbon feed contains hydrocarbons selected from the group consisting of paraffinic hydrocarbons, naphtha, virgin gas oil, cycle gas oil and $C_6$-$C_8$ aromatic hydrocarbons.

6. A process according to claim 1 including the following additional steps:

separating the mixture of hydrocarbons, hydrogen, and reaction products into a normally gaseous phase and a normally liquid phase, recovering the normally gaseous hydrocarbons from the gaseous phase and passing the normally liquid phase into the reaction zone.

7. A process according to claim 6 including the following additional steps:

recovering hydrogen from the normally gaseous phase and passing said hydrogen into the reaction zone.

8. A process according to claim 1 wherein the feed is passed continuously in contact with said aluminosilicate effecting conversion of at least 30 volume percent of said feed per pass to said normally gaseous hydrocarbons.

9. A process for producing normally gaseous hydrocarbon which comprises:

contacting a normally liquid hydrocarbon feed and hydrogen in a reaction zone with a decationized crystalline aluminosilicate of the mordenite type having a silica to alumina mole ratio greater than about 10:1 and less than about 20:1 and 0.05-5.0 wt. percent, based on said aluminosilicate, of a Group VIII metal having an atomic weight greater than 100 intimately associated with said aluminosilicate under hydroconversion conditions effecting conversion of said normally liquid hydrocarbon feed to normally gaseous hydrocarbons.

10. A process according to claim 9 wherein the conversion conditions include a temperature of 400-1000° F., a pressure of 0-3000 p.s.i.g., a space velocity of 0.1-10 v./hr./v. and a hydrogen rate of 100-20,000 s.c.f./b. of feed.

11. A process according to claim 9 wherein said normally liquid hydrocarbon feed contains hydrocarbons selected from the group consisting of paraffinic hydrocarbons, naphtha, virgin gas oil, cycle gas oil and $C_6$-$C_8$ aromatic hydrocarbons.

References Cited

UNITED STATES PATENTS

| | | | |
|---|---|---|---|
| 3,236,761 | 2/1966 | Rabo et al. | 208—111 |
| 3,367,884 | 2/1968 | Reid | 252—455 |
| 2,428,692 | 10/1947 | Voorhies | 260—683.6 |
| 3,480,539 | 10/1969 | Voorhies et al. | 208—111 |
| 3,663,423 | 5/1972 | Bennett et al. | 208—59 |
| 3,539,498 | 10/1970 | Morris et al. | 208—111 |
| 3,663,430 | 5/1972 | Morris | 208—111 |
| 3,594,310 | 7/1971 | Pollitzer | 208—111 |

DELBERT E. GANTZ, Primary Examiner

G. E. SCHMITKONS, Assistant Examiner

U.S. Cl. X.R.

208—Dig 2, 59, 102, 676 R, 683 R